Aug. 30, 1949.  C. J. MALHIOT  2,480,253
ARTICLE CONVEYING MECHANISM
Original Filed May 8, 1942  7 Sheets-Sheet 1

Inventor:
Clarence J. Malhiot
By Spencer, Margall, Johnston & Cook
Attys

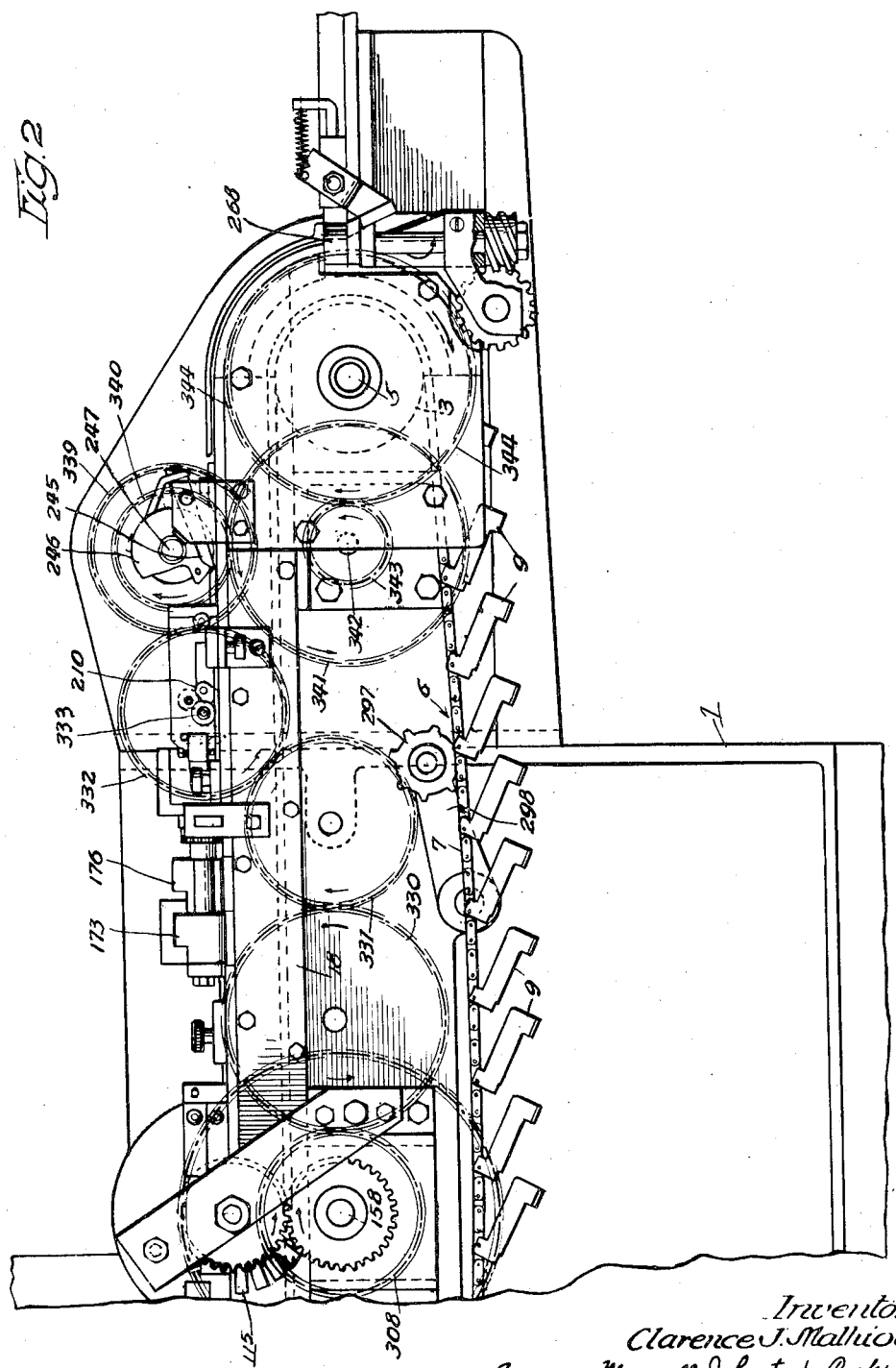

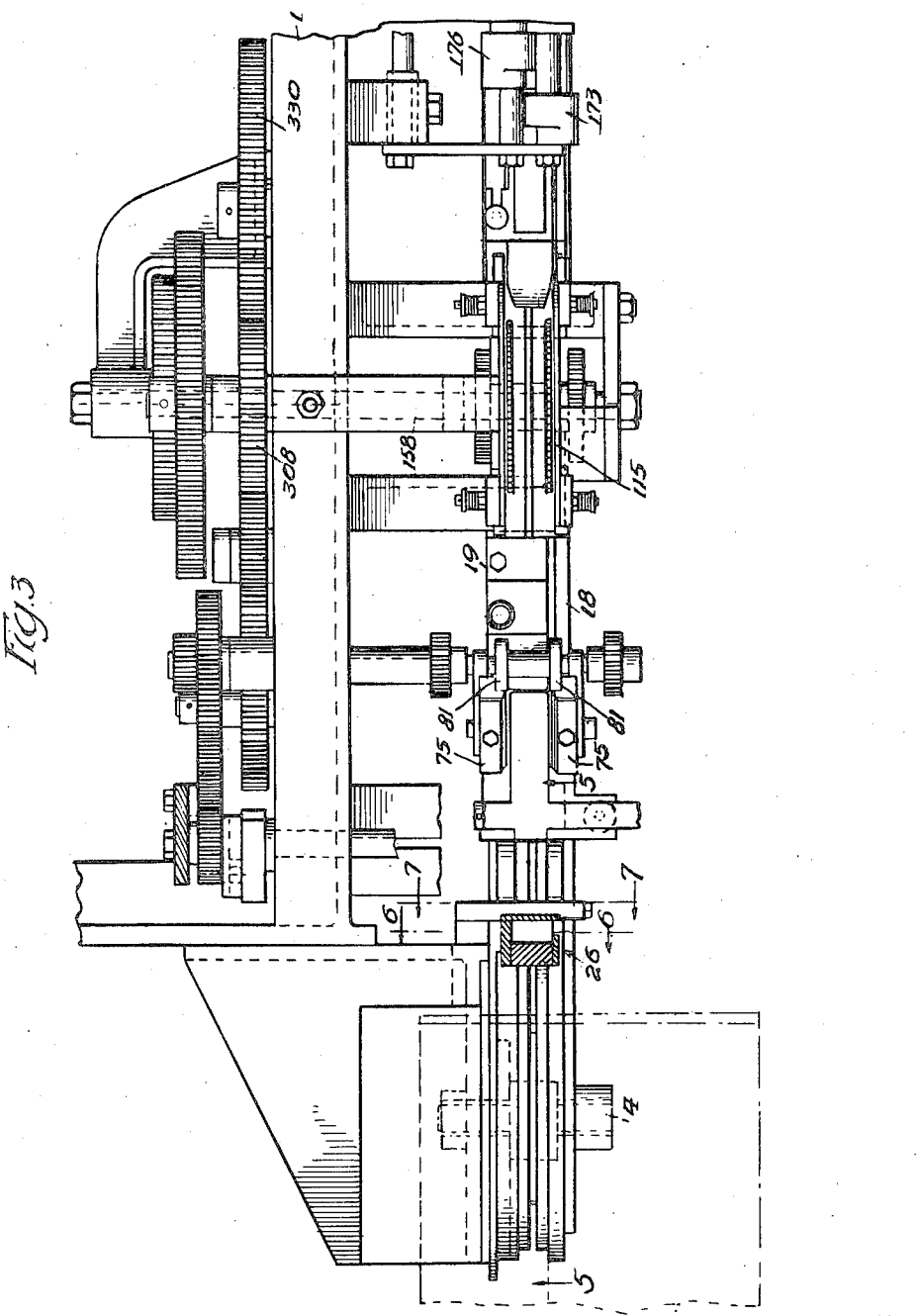

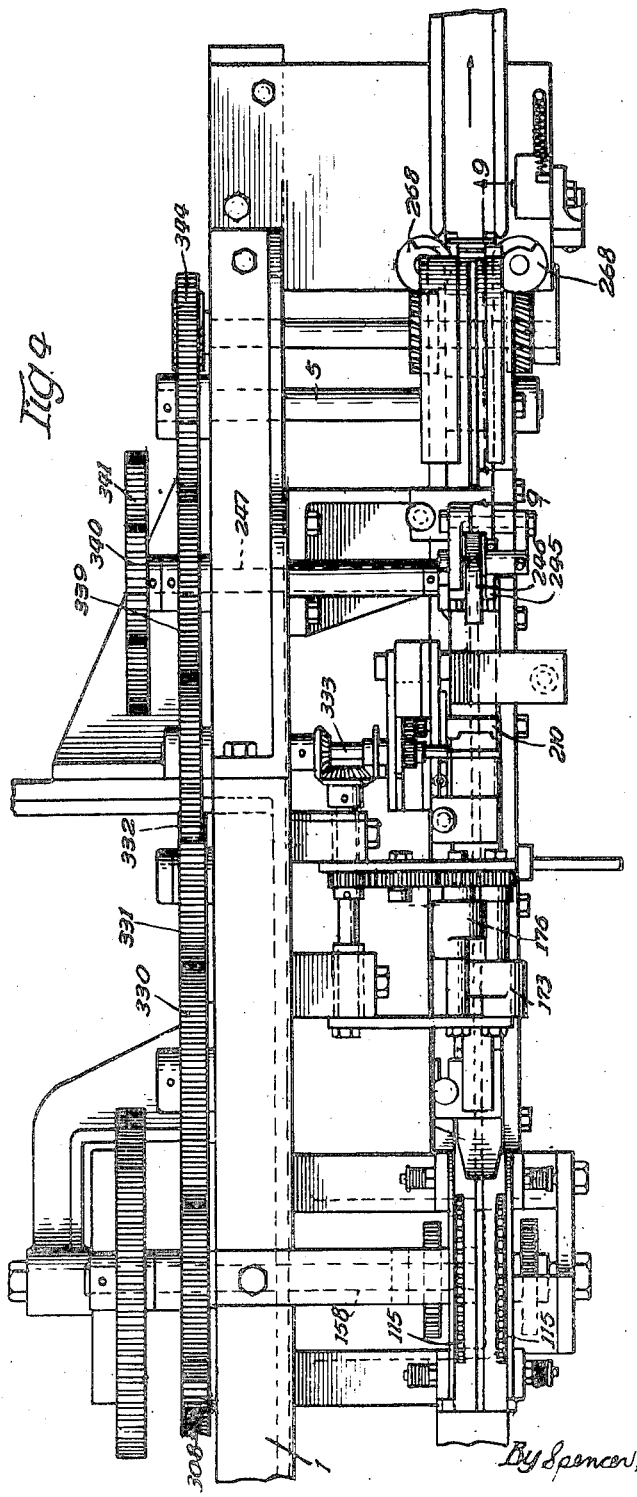

Aug. 30, 1949.　　　　C. J. MALHIOT　　　　2,480,253
ARTICLE CONVEYING MECHANISM
Original Filed May 8, 1942　　　　　　　　　7 Sheets-Sheet 5
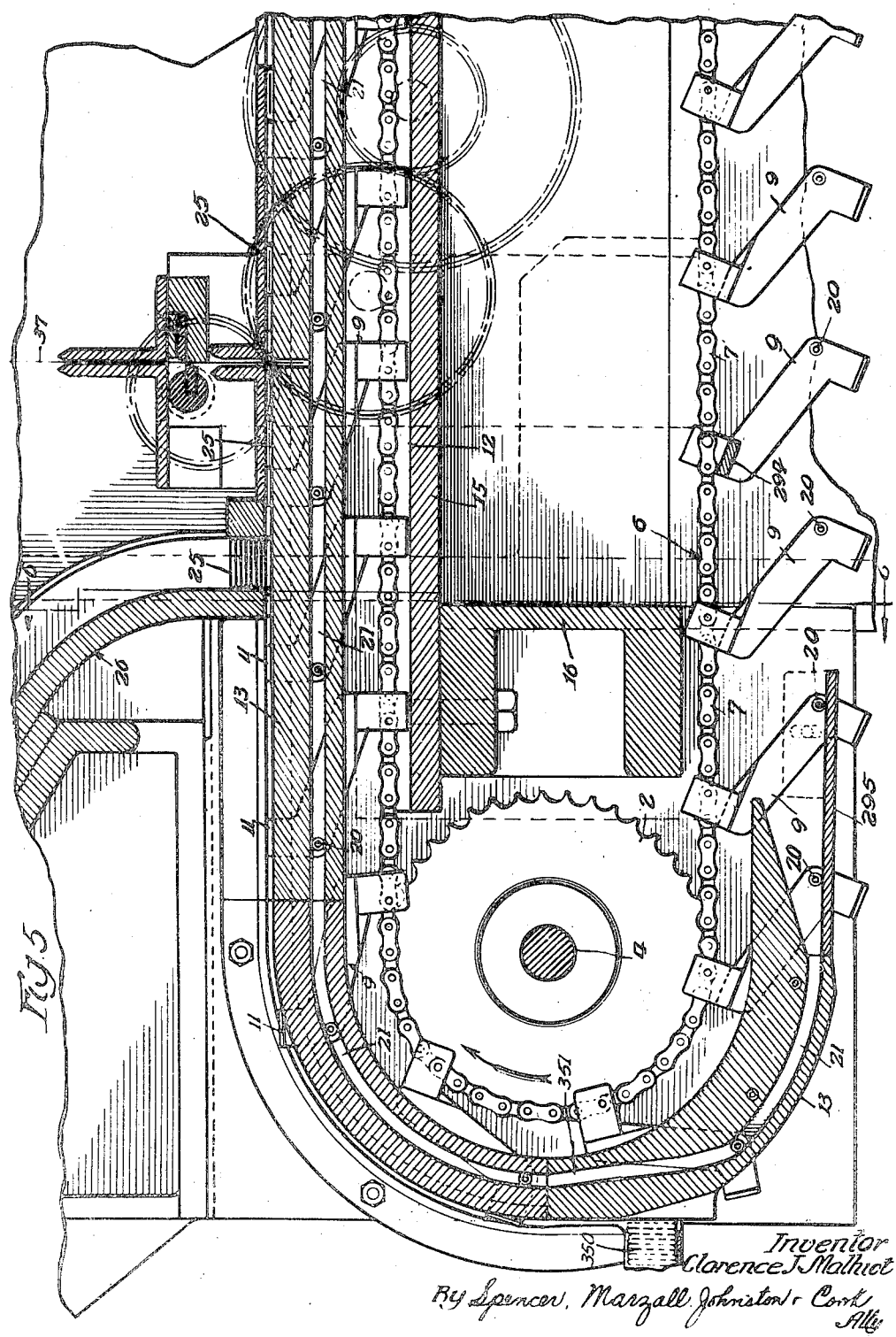
Inventor
Clarence J. Malhiot
By Spencer, Marzall, Johnston & Cook
Atty.

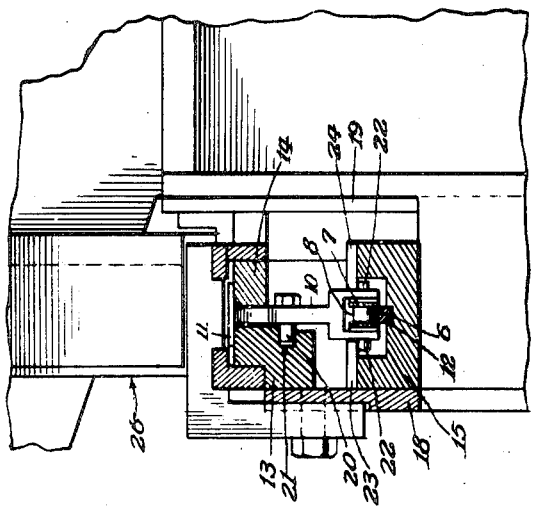

Aug. 30, 1949.    C. J. MALHIOT    2,480,253
ARTICLE CONVEYING MECHANISM
Original Filed May 8, 1942    7 Sheets—Sheet 7
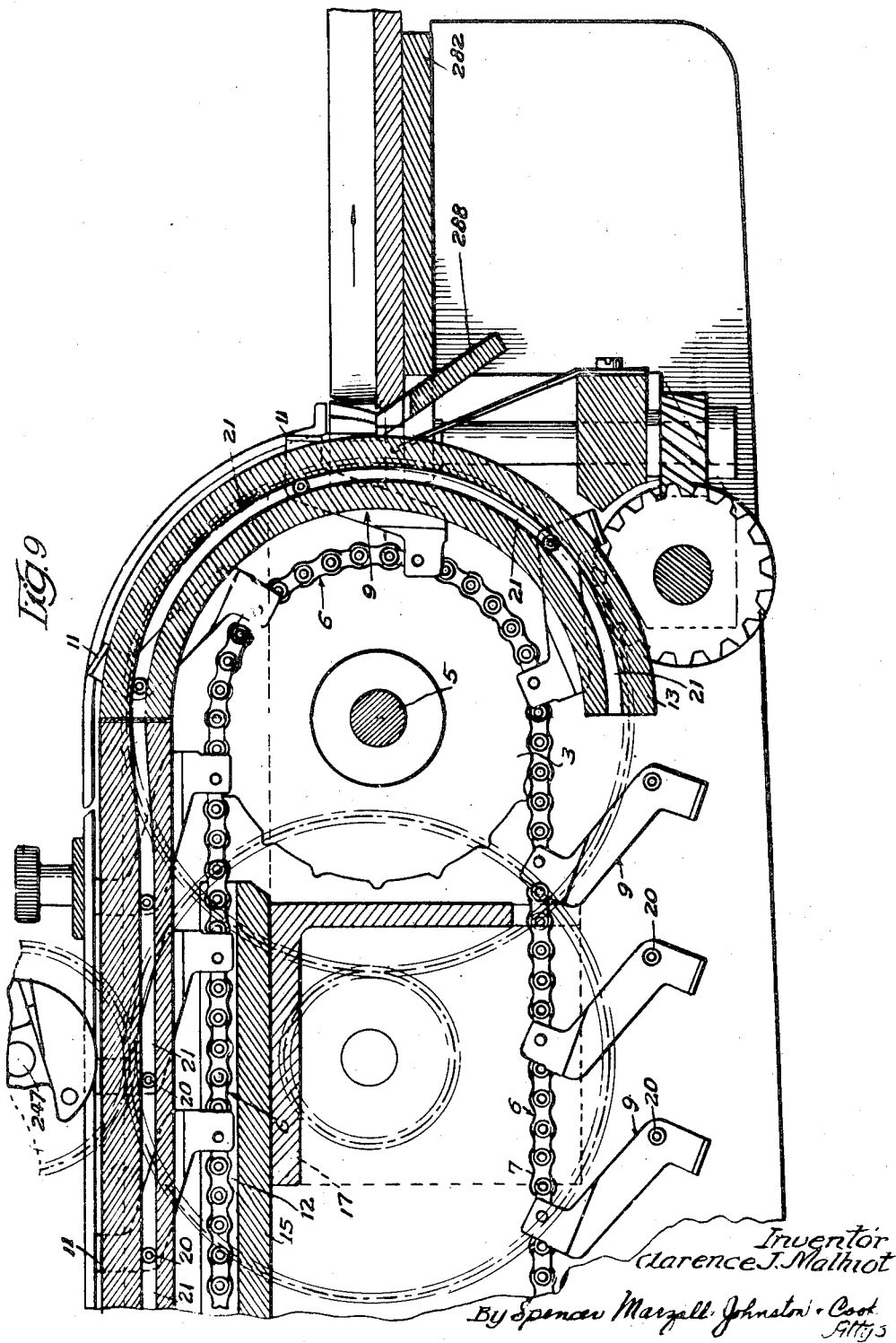

Patented Aug. 30, 1949

2,480,253

UNITED STATES PATENT OFFICE 2,480,253

ARTICLE CONVEYING MECHANISM

Clarence J. Malhiot, Oak Park, Ill., assignor to F. B. Redington Co., Chicago, Ill., a corporation of Illinois Original application May 8, 1942, Serial No. 442,205, now Patent No. 2,426,314, dated August 26, 1947. Divided and this application September 9, 1944, Serial No. 553,449

7 Claims. (Cl. 198—170)

This invention relates generally to article conveying mechanism and particularly to mechanism for conveying articles which are especially small and thin, such as razor blades. This application is a division of a copending application filed by the same applicant on May 8, 1942, as Serial No. 442,205 and issued August 26, 1947, as Patent No. 2,426,314.

One of the particular objects of the invention is to provide mechanism adapted to convey articles being wrapped, such as razor blades, at a constant high speed. Another object of the invention is to provide mechanism adapted to convey an article being wrapped in substantially a straight line throughout the complete wrapping of the article and its discharge from the machine.

A further object of the invention is the provision of a continuous moving article conveyor which is adapted to feed partially wrapped articles into an inverting or reversing mechanism, and thereafter pick up articles from the inverting mechanism and move the same through further wrapping stations.

These and other objects will be apparent from the following description, the appended claims and the accompanying drawings, which illustrate a selected embodiment of the invention and in which:

Fig. 2 is a front elevation of the right-hand portion of the machine illustrated in Fig. 1, the two views partially overlapping;

Fig. 3 is a plan view of the apparatus shown in Fig. 1, certain parts being omitted for clarity;

Fig. 4 is a plan view of the apparatus shown in Fig. 2;

Fig. 5 is an enlarged fragmentary section taken along the line 5—5 of Fig. 3 and illustrating the mechanism at the feeding end of the machine;

Fig. 6 is a sectional detail taken along the line 6—6 of Figs. 3 and 5;

Fig. 7 is a sectional detail taken along the line 7—7 of Fig. 3;

Fig. 8 is a perspective view illustrating the manner in which a pusher element engages an article in accordance with the present invention; and Fig. 9 is a fragmentary longitudinal section taken at the right-hand end of the machine as indicated by the line 9—9 of Fig. 4.

Like characters of reference indicate the corresponding parts in the different views of this application as well as designating the same parts in the aforesaid co-pending application Serial No. 442,205.

Figure 1:
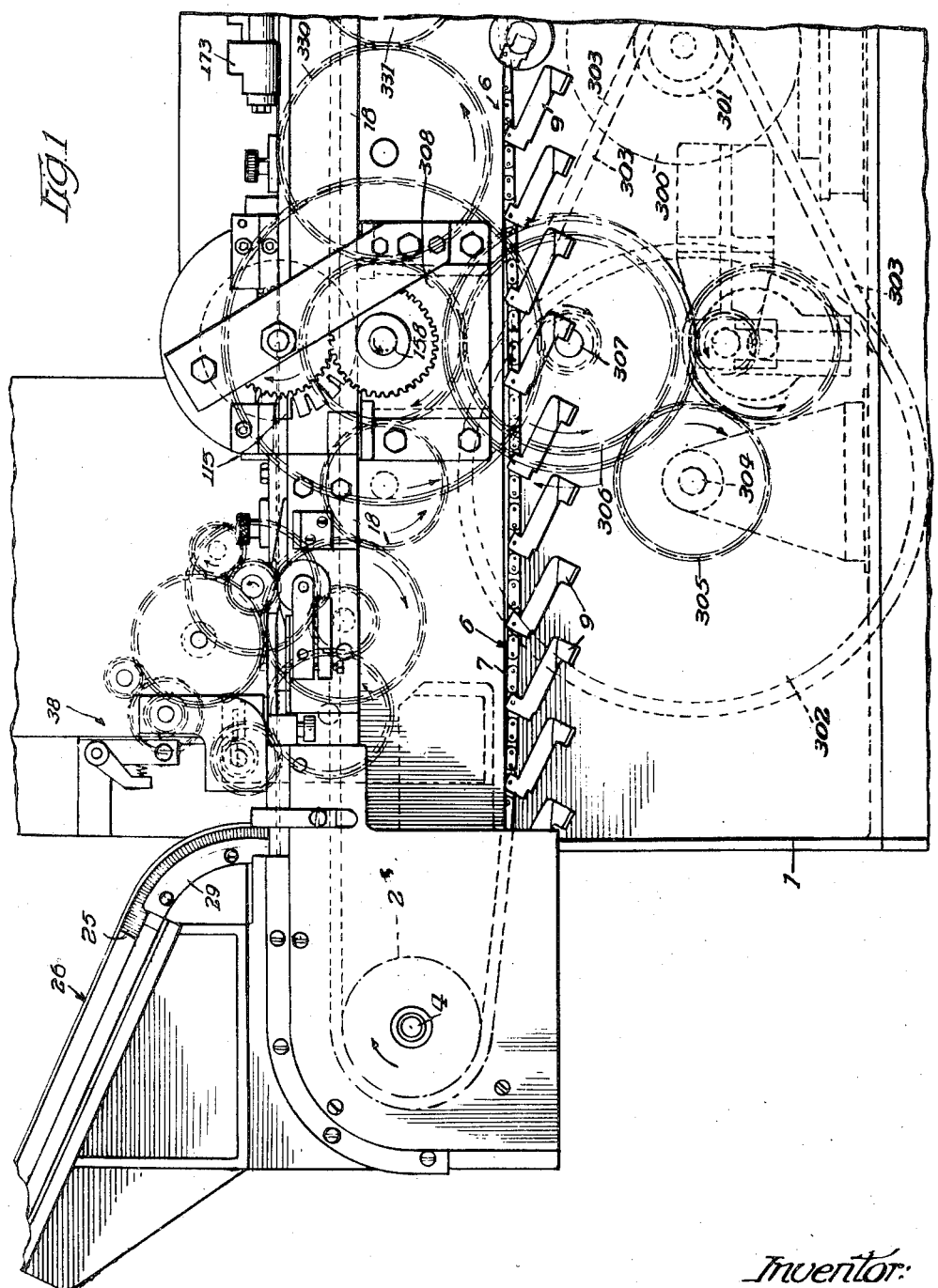
Fig. 1 is a front elevation of the left-hand portion of a machine constructed in accordance with the present invention.

The particular machine herein shown for the purpose of illustrating the invention comprises a vertical main frame 1 which extends longitudinally of the machine and supports the various operating parts thereof.

*Article conveying mechanism*

A pair of sprockets 2 and 3 are mounted upon shafts 4 and 5, which are suitably supported upon main frame 1, and these sprockets carry a conveyor chain 6. The chain 6 comprises a plurality of links 7 pivotally joined together with rollers 8, Fig. 7, therebetween.

A plurality of substantially T-shaped article advancing or pusher members 9 are pivotally connected to the conveyor chain 6. Each of the pusher elements 9 comprises a stem portion 10, Figs. 6 and 7, and a pusher portion 11. Each pusher portion co-acts with an article 25, such as a razor blade, to be wrapped in the manner shown in Fig. 8. The pusher elements 9 travel along guide rails 12, 13 and 14 during operative movement. Guide rail 12 is mounted in a substantially U-shaped channel 15 which extends between the upper portions of the sprockets 2 and 3 and is supported at the left-hand end of the machine by a U-shaped bracket 16, Fig. 5, and at the right-hand end of the machine by a T-shaped bracket 17, Fig. 9. The rollers 8 of the conveyor chain are adapted to travel along the upper surface of the guide rail 12 and to be guided thereby, Fig. 7.

The guide rails 13 and 14 are suitably attached to side plates 18 and 19 which extend throughout the length of the machine. The guide rails 13 and 14 provide a table for supporting the article 25, such as a razor blade, to be wrapped, and also as a guide for the upper portions 11 of the pusher members 9. These guide rails extend from a position adjacent the lower end of the left hand sprocket 2, as shown in Fig. 5, to a position adjacent the lower end of the sprocket 3, as shown in Fig. 9.

Each of the pusher members 9 is also provided with a pin 20 which is adapted to ride within a cam groove 21 provided in the guide rail 13. The cam groove 21 extends throughout the length of the guide rail 13 and provides for constantly controlling the pusher elements during the operative portion of their movement. A pivot pin 22 also extends outwardly from the pusher members 9 and is received beneath a pair of guide plates 23 and 24 mounted upon the channel member 15.

The guide rails 12, 13 and 14 together with the pins 20 and 22, the cam groove 21 and the guide plates 23 and 24 provide for maintaining the pusher members always in proper position, Figs. 5, 6, 7, and 9.

During the return travel of the conveyor 6, the pushers 9 are allowed to drop to a free position as shown in Figs. 1, 2, 5 and 9. The downward drop of the pushers is limited by engagement of a cross bar 294 with the links of the conveyor chain as shown in Fig. 5. At the left hand end of the machine the pins 20 of the pushers are guided into the cam groove 21 by an adjustably mounted guide 295 also shown in Fig. 5. Proper tension in the conveyor chain 6 is maintained by a sprocket 297 carried by a pivotally mounted arm 298, Fig. 2.

*Drive for conveying mechanism*

The article conveying mechanism is driven from a power source such as a motor 300, Fig. 1, the article conveying mechanism being coordinated with the other parts of the machine so as to operate the entire wrapping machine in proper timed relationship.

The motor 300 drives a pulley 301 which is connected with a pulley 302 by a belt 303. The pulley 302 is mounted on a main drive shaft 304 which has a gear 305 attached thereto. The gear 305 meshes with a gear 306 loosely mounted on a shaft 307. The gear 306 meshes with a gear 308 loosely mounted upon a shaft 158. The gear 308 meshes with an idler gear 330 which meshes with a gear 331. The gear 331 meshes with a gear 332 which is mounted on a shaft 33, Fig. 2. The gear 332 meshes with a gear 339 mounted upon a shaft 247. The shaft 247 carries a pinion 340 which meshes with a gear 341 rotatably mounted upon a shaft 342 located beneath the shaft 247. A pinion 343 is attached to the gear 341 and engages a gear 344 which is attached to the shaft 5 of the right hand sprocket wheel 3 and thereby drives the rotary conveyor chain 6, Figs. 2 and 4.

*Operation*

The conveyor chain is continuously moved by the sprocket 3 and thereby continuously advances the pushers 9 and the pusher heads 11. The articles 25 are advanced to the guide rails 13 and 14, along which pusher heads 11 travel, by means of a feeding chute 26, Fig. 5. Alternatively, the articles may be fed along a horizontally arranged chute 350, the cam track 21 being provided with a portion 351 providing for proper feeding engagement of the pusher heads 11 with an article to be fed, Fig. 5.

The pushers 9 feed the articles to a wrapper feed station 38, Fig. 1, where the articles are fed into wrappers. As shown more particularly in Fig. 5, these wrappers 37 are partially folded about the leading edge of the article. Thereafter the partially wrapped articles are passed along to stationary end flap tuckers 75 (Fig. 3), and the tucked end flaps are rolled down by a plurality of rolls including rolls 81. The tucked end flaps are then folded downwardly and thereafter the partially wrapped article is inverted by a reversing wheel 115. Following inversion, the articles are again picked up by the conveyor 6 and are moved past a pair of rotary end flap folders 173 and 176, Fig. 4, which fold the end flaps downwardly against the body of the article and wrapper. A forward extending flap of the wrapper is then tucked and rolled inwardly and is thereafter rolled by a pair of flap creasers 210, Fig. 4.

The forwardly extending side flap portions of the wrapper are next folded upwardly about the leading edge of the article by the bars 245, Fig. 4. Thereafter a folder 246 engages the upraised flap portions and folds them downwardly against the article. Thereafter the article is moved to discharge position where a pair of rotary discharge members 268 discharges the article from the conveyor 6 and moves the article into a discharge chute.

The complete details of the several stations to which the article conveying mechanism carries the article being wrapped are not described in this application because they form no part of the article conveying mechanism per se. However, each station is described in complete detail in the applicant's copending application Serial No. 442,205, and if further information is desired reference may be had thereto.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a machine for wrapping thin articles, such as razor blades and the like, a conveyor comprising means forming a transfer support providing spaced rails for said articles and a slot opening between said rails, an endless flexible chain supported on sprockets at the opposite ends of said transfer support, with a reach of said chain extending between the sprockets and along and adjacent said slot opening, a guide rail supporting said chain between said sprockets to maintain the same accurately positioned with respect to the spaced rails of the transfer support during travel of the chain along said support, said transfer support having curved extensions projecting around the sprockets at each end of the support and forming curved continuations of said spaced rails and slot opening, pushers pivoted at spaced intervals on said chain and having shank portions adapted to extend in and ride along said slot opening, including the portions thereof in said curved extensions, said shank portions carrying head portions adapted to ride along said spaced rails in the path of said thin articles to push and follow the same along said path, and cooperating means on said pushers and on said transfer support and its extensions for holding said head portions at all times within said path and in position to engage and push said thin articles.

2. In a machine for wrapping thin articles, such as razor blades and the like, a conveyor comprising means forming a transfer support providing spaced rails for said articles and a slot opening between said rails, an endless flexible chain supported on sprockets at the opposite ends of said transfer support, with a reach of said chain extending between the sprockets and along and adjacent said slot opening, a guide rail supporting said chain between said sprockets to maintain the same accurately positioned with respect to said spaced rails during travel of the chain along said support, pushers pivoted at spaced intervals on said chains and swingable outwardly thereof, cooperating means on said chain and pushers to limit the outward swinging movement of the pushers, said pushers each having a shank portion adapted to extend in and ride along said slot opening, a head portion on said shank portion having transverse sectional shape corresponding with that of the thin articles, and cooperating means comprising a cam groove on the transfer support and its extensions and a cam follower on the shank of each of said pushers in position to engage said cam groove as the pusher enters said slot opening, at one end of the conveyor whereby to draw said head portion inwardly on said chain and to maintain said head portion in accurate position with respect to the support track in position to engage behind and push said thin articles along said support track.

3. In a machine for wrapping thin articles, a conveyor embodying a support upon which the articles are moved therealong, said support embodying members spaced from each other to provide a slot therebetween, a continuously operating endless chain passing over sprockets at the opposite ends of said support, one of the runs of the chain being disposed beneath said support, adjacent thereto and along said slot, a support for said run extending along and beneath said slot, pusher members pivotally connected to said chain and extending through said slot, a guideway disposed beneath said first-mentioned support between the said support and the adjacent run of said chain, means on said pusher members engaging and movable along said guide-way, and a pusher head connected with each of said pushers, resting upon and movable along the top of said support, for engaging and pushing the articles along the support.

4. In a machine for wrapping thin articles, a conveyor embodying a support upon which the articles are moved therealong, said support embodying members spaced from each other to provide a slot therebetween, a continuously operating endless chain passing over sprockets at the opposite ends of said support, one of the runs of the chain being disposed beneath said support, adjacent thereto and along said slot, a support for said run extending along and beneath said slot, pusher members pivotally connected to said chain and extending through said slot, a guideway disposed beneath said first-mentioned support between the said support and the adjacent run of said chain, means on said pusher members engaging and movable along said guideway, and a pusher head connected with each of said pushers, resting upon and movable along the top of said support, for engaging and pushing the articles along the support, said slotted support projecting around the chain sprockets at the ends of said support.

5. In a machine for wrapping thin articles, a conveyor embodying a support upon which the articles are moved therealong, said support embodying members spaced from each other to provide a slot therebetween, a continuously operating endless chain passing over sprockets at the opposite ends of said support, one of the runs of the chain being disposed beneath said support, adjacent thereto and along said slot, a support for said run extending along and beneath said slot, pusher members pivotally connected to said chain and extending through said slot, a guideway disposed beneath said first-mentioned support between the said support and the adjacent run of said chain, means on said pusher members engaging and movable along said guideway, and a pusher head connected with each of said pushers, resting upon and movable along the top of said support, for engaging and pushing the articles along the support, the point of engagement of the said means with the said guideway being spaced a substantial distance from the point of pivotal connection of the pushers with said chain, in a direction lengthwise of the run of said chain, whereby to maintain the pusher heads in the path of the articles to engage and push them along the said support.

6. In a machine of the character described, a conveyor for delivering articles successively to and through a plurality of stations to be operated upon comprising means forming a transfer support providing spaced rails for said articles and a slot opening between the rails, an endless flexible chain supported on sprockets at the opposite ends of said transfer support, with a reach of said chain extending between the sprockets and along and adjacent said slot opening, a guideway disposed beneath the transfer support and between said support and the adjacent run of said chain, pushers pivoted on said chain and having shank portions adapted to extend in and ride along said slot opening, said shank portions carrying head portions adapted to ride on at least one of said rails to draw said articles therealong, and guiding and aligning means on said pushers and cooperating with said guideway to guide the head portions of the pushers in accurate alignment in the path of articles along said spaced rails in position to push and follow the articles.

7. In a machine of the character described, a conveyor for delivering articles successively to and through a plurality of stations to be operated upon comprising means forming a transfer support providing spaced rails for said articles and a slot opening between the rails, an endless flexible chain supported on sprackets at the opposite ends of said transfer support, with the reach of said chain extending between the sprockets and along and adjacent said slot opening, a groove formed in said transfer support and disposed between the article supporting surface of said support and the adjacent run of said chain, pushers pivoted on said chain and having shank portions adapted to extend in and ride along said slot opening, said shank portions carrying head porions adapted to ride on at least one of said rails to draw said articles therealong, and means cooperating with said groove comprising a follower on each of said pushers in position to ride said groove to guide the head portions of said pushers in alignment in the path of said articles along said spaced rails in position to engage and push the articles along the spaced rails and to follow the articles.

CLARENCE J. MALHIOT.

REFERENCES CITED

The following references are of record in the file of this patent:

UNITED STATES PATENTS

| Number | Name | Date |
| --- | --- | --- |
| 1,572,256 | Van Buren | Feb. 9, 1926 |
| 1,593,501 | Martin et al. | July 20, 1926 |
| 1,987,871 | Rose | Jan. 15, 1935 |
| 2,034,160 | Taylor | Mar. 17, 1936 |
| 2,131,428 | Dalkowitz | Sept. 27, 1938 |
| 2,336,795 | Malhiot | Dec. 14, 1943 |